(12) United States Patent
Hibbeler et al.

(10) Patent No.: US 9,268,886 B2
(45) Date of Patent: Feb. 23, 2016

(54) SETTING SWITCH SIZE AND TRANSITION PATTERN IN A RESONANT CLOCK DISTRIBUTION SYSTEM

(71) Applicant: INTERNATIONAL BUSINESS MACHINES CORPORATION, Armonk, NY (US)

(72) Inventors: Jason D. Hibbeler, Williston, VT (US); William R. Reohr, Ridgefield, CT (US); Phillip J. Restle, Katonah, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 14/136,651

(22) Filed: Dec. 20, 2013

(65) Prior Publication Data

US 2014/0240021 A1 Aug. 28, 2014

Related U.S. Application Data

(62) Division of application No. 13/773,854, filed on Feb. 22, 2013.

(51) Int. Cl.
*G06F 17/50* (2006.01)
*H03K 5/00* (2006.01)

(52) U.S. Cl.
CPC ........ *G06F 17/5009* (2013.01); *G06F 17/5045* (2013.01); *G06F 17/5068* (2013.01); *H03K 5/00* (2013.01); *G06F 2217/62* (2013.01); *G06F 2217/78* (2013.01); *H03K 2005/00195* (2013.01)

(58) Field of Classification Search
CPC ..................................... G06F 1/10; G06F 1/08

USPC .......................................................... 716/133
See application file for complete search history.

(56) References Cited

U.S. PATENT DOCUMENTS

| 5,511,126 A   | 4/1996 | Westwick |
|---|---|---|
| 5,633,805 A * | 5/1997 | Simonsen ..................... 716/104 |
| 6,172,507 B1  | 1/2001 | Hermann |
| 6,242,936 B1  | 6/2001 | Ho et al. |

(Continued)

FOREIGN PATENT DOCUMENTS

| JP | 05072260 | 3/1993 |
|---|---|---|
| JP | 10302500 | 11/1998 |

OTHER PUBLICATIONS

Notice of Allowance dated May 12, 2014 for U.S. Appl. No. 14/136,770; 9 pages.

(Continued)

*Primary Examiner* — Jack Chiang
*Assistant Examiner* — Brandon Bowers
(74) *Attorney, Agent, or Firm* — David Cain; Andrew M. Calderon; Roberts Mlotkowski Safran & Cole, P.C.

(57) ABSTRACT

Recycling energy in a clock distribution network is provided. A method includes creating a resonant clocking circuit including a clock grid. The method further includes providing resonant structures distributed in the clock grid. The method further includes providing switches that control the resonant structures to switch between a non-resonant mode and a resonant mode. The method further includes determining a switch size that minimizes power consumption of the resonant clocking circuit by iteratively increasing sizes of the switches and, for each iterative increase in size, determining power consumed by the resonant clocking circuit.

12 Claims, 14 Drawing Sheets

(56) References Cited

U.S. PATENT DOCUMENTS

| | | | |
|---|---|---|---|
| 6,832,173 | B1 | 12/2004 | Starr et al. |
| 7,082,580 | B2 | 7/2006 | Zarkesh-Ha et al. |
| 7,237,217 | B2 * | 6/2007 | Restle .......................... 327/291 |
| 7,268,754 | B2 | 9/2007 | Tsai et al. |
| 8,120,968 | B2 | 2/2012 | Reohr et al. |
| 8,736,342 | B1 * | 5/2014 | Bucelot et al. ................ 327/304 |
| 2010/0026335 | A1 | 2/2010 | Fujii et al. |
| 2011/0084736 | A1 | 4/2011 | Papaefthymiou et al. |
| 2011/0084772 | A1 | 4/2011 | Papaefthymiou et al. |
| 2011/0084773 | A1 | 4/2011 | Papaefthymiou et al. |
| 2011/0084774 | A1 * | 4/2011 | Papaefthymiou et al. .... 331/117 FE |
| 2011/0090018 | A1 | 4/2011 | Papaefthymiou et al. |
| 2011/0090019 | A1 | 4/2011 | Papaefthymiou et al. |
| 2011/0140753 | A1 | 6/2011 | Papaefthymiou et al. |
| 2013/0229189 | A1 | 9/2013 | Pang et al. |

OTHER PUBLICATIONS

Sathe, V. et al., "Resonant-Clock Latch-Based Design", IEEE Journal of Solid-State Circuits, vol. 43, No. 4, Apr. 2008, pp. 864-873.

Chan, S. et al., "A Resonant Global Clock Distribution for the Cell Broadband Engine Processor", IEEE Journal of Solid-State Circuits, vol. 44, No. 1, Jan. 2009, pp. 64-72.

Sathe, V. et al., "Resonant Clock Design for a Power-efficient, High-volume x86-64 Microprocessor", ISSCC 2012, Jun. 19, 2012, 13 pages.

Ziesler, C. et al., "A 225 MHz Resonant Clocked ASIC Chip", ISLPED, Aug. 25-27, 2003, pp. 48-53.

Hu, X. et al., "Distributed Resonant Clock Grid Synthesis (ROCKS)", DAC'11, Jun. 5-10, 2011, pp. 516-521.

Drake, A. et al., "Resonant Clocking Using Distributed Parasitic Capacitance", IEEE 2003 Custom Integrated Circuits Conference, 2003, pp. 647-650.

Chan, S. et al., "Design of Resonant Global Clock Distributions", Proceedings of the 21st International Conference on Computer Design (ICCD'03), IEEE, 2003, 6 pages.

U.S. Appl. No. 13/759,311, filed Feb. 5, 2013; 50 pages.

Office Action dated Feb. 14, 2014 for U.S. Appl. No. 13/773,854; 11 pages.

Notice of Allowance dated Jun. 23, 2014 for U.S. Appl. No. 13/773,854; 5 pages.

* cited by examiner

SETTING SWITCH SIZE AND TRANSITION PATTERN IN A RESONANT CLOCK DISTRIBUTION SYSTEM

FIELD OF THE INVENTION

The invention relates to clock distribution in integrated circuits and, more particularly, to reducing the power consumed by a clock distribution system in an integrated circuit.

BACKGROUND

Integrated circuits (large scale, very large scale, etc., including system-on-chip (SOC) configurations) employ one or more master (i.e., primary) clock signals to synchronize logic operations. Clock distribution systems distribute master clock signals from sources of periodic signals to circuit destination nodes. To synchronize operations of integrated circuits, the clock distribution systems are designed such that the clock transitions (i.e., rising edges and/or falling edges) at each destination node within the integrated circuit occur substantially simultaneously. However, variations in the clock signal occur at different nodes due to physical features of the clock distribution system (e.g., distance from the source and performance variations of components). These clock signal variations are called "skew." If the design of a clock distribution system results in skew that exceeds margins permitted by timing requirements of the integrated circuit's design, the integrated circuit may not function as intended.

Further, the clock distribution system consumes a large portion of the total system power of the integrated circuit. Resonant clocking is a technique that reduces the power required to drive the clock distribution system by recycling energy using coupled LC (inductance and capacitance) oscillator circuits which are incorporated in the clock distribution system. Oscillations of resonant clocking systems are tuned to specific frequencies. As such, integrated circuits (e.g., processors) that operate at different frequencies must be able to enable and disable resonant clocking.

SUMMARY

In a first aspect of the invention, there is a method for providing a resonant clocking circuit that includes creating a resonant clocking circuit including a clock grid. The method further includes providing resonant structures distributed in the clock grid. The method further includes providing switches corresponding to the resonant structures, each of the switches controlling a corresponding one of the resonant structures to switch between a non-resonant mode and a resonant mode. The method further includes determining a switch size that minimizes power consumption of the resonant clocking circuit by iteratively increasing respective sizes of the switches and, for each iterative increase in size, determining power consumed by the resonant clocking circuit.

In another aspect of the invention, there is a system for providing a resonant clocking circuit including a computer device comprising a processor and a design tool that is structured and arranged to model a resonant clocking circuit including resonant structures having respective switches that control the resonant structures to switch between a non-resonant mode and a resonant mode. The computer device is further arranged to determine power consumed by the resonant clocking circuit operating with the switches while iteratively increasing sizes of the switches.

In another aspect of the invention, there is a method for providing a resonant clocking circuit that includes creating a clock grid including resonant structures distributed in the clock grid. The method further includes providing programmable switches that switch a respective one the resonant structures between a non-resonant mode and a resonant mode, each of the programmable switches being controllable to progressively energize the respective one of the resonant structures. The method further includes determining a transition pattern for controlling the programmable switches to progressively energize the resonant structures.

In another aspect of the invention, there is a system for providing a resonant clocking circuit including a computer device comprising a processor and a design tool that is structured and arranged to model a resonant clocking circuit including resonant structures having respective switches that control the resonant structures to switch between a non-resonant mode and a resonant mode. The computer device is further arranged to determine a transition pattern for activating the switches to progressively switch the resonant structures between the non-resonant mode and the resonant mode.

In another aspect of the invention, there is a computer program product for providing an integrated circuit including a resonant clocking circuit, the computer program product comprising a computer readable storage medium having program code embodied therewith, the program code being readable and/or executable by a processor of a computer device to provide a resonant clocking circuit comprised of a clock grid including resonant structures distributed in respective sectors of the clock grid, the resonant structures having respective switches that control the resonant structures to switch between a non-resonant mode and a resonant mode. Further, the program code is readable and/or executable by the processor of the computer device to determine performance parameters of the resonant clocking circuit while a first resonant structure is deactivated via a respective one of the plurality of switches. Further, when the performance parameters of the resonant clocking circuit are outside predefined design constraints, the program code is readable and/or executable by the processor of the computer device to store a first value in a repair information record corresponding to a first sector that includes the first resonant structure. The first value indicates that the first sector must be functional for the resonant clocking circuit to operate in resonant mode. Further, when the performance parameters of the resonant clocking circuit are within the predefined design constraints, the program code is readable and/or executable by the processor of the computer device to store a second value in the repair information record corresponding to the first sector that includes the first resonant structure. The second value indicates that the first sector is not required to be functional for the resonant clocking circuit to operate in resonant mode.

In another aspect of the invention, a design structure tangibly embodied in a machine readable storage medium for designing, manufacturing, or testing an integrated circuit is provided. The design structure comprises the structures of the present invention. In further embodiments, a hardware description language (HDL) design structure encoded on a machine-readable data storage medium comprises elements that when processed in a computer-aided design system generates a machine-executable representation of a circuit for recycling energy in a clock distribution network which comprises the structures of the present invention. In still further embodiments, a method in a computer-aided design system is provided for generating a functional design model of the circuit for recycling energy in a clock distribution network. The method comprises generating a functional representation of the structural elements of the circuit for recycling energy in a clock distribution network.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
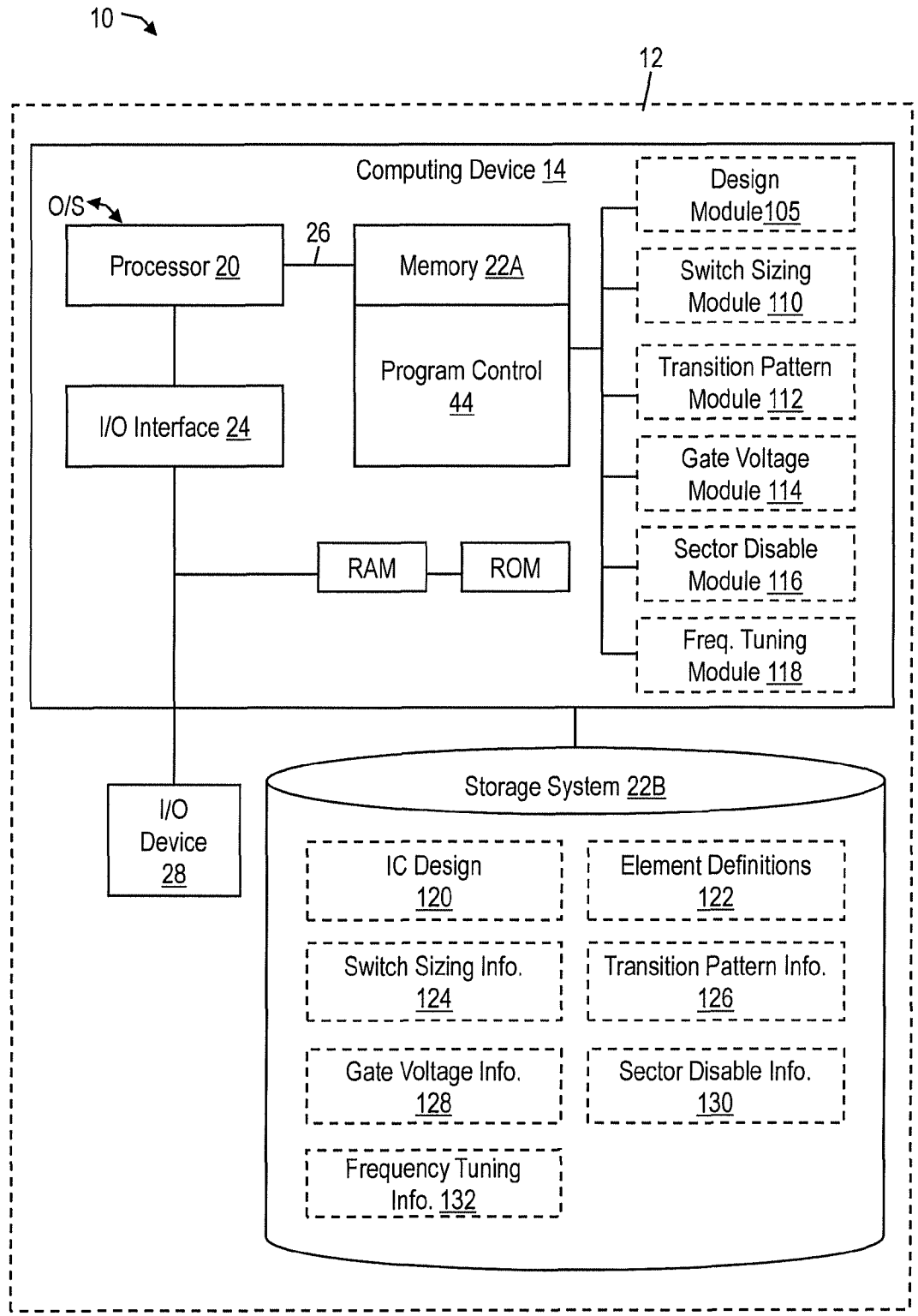
FIG. 1 shows an illustrative environment for implementing designs and steps in accordance with aspects of the invention.

The invention relates to clock distribution in integrated circuits and, more particularly, to reducing the power consumed by a clock distribution system in an integrated circuit. Embodiments of the invention provide a chip and an automated chip design process for implementing resonant clocking in a clock distribution system. Aspects of the invention provide a clock distribution system including resonant structures having switches that selectively enable and disable the resonant structures resulting in two modes of operation: a resonant mode and a non-resonant mode. Further, aspects of the invention reduce the area and power overhead of the resonant enable/disable switches. Further, aspects of the invention determine a transition pattern that transitions the clock distribution system from the non-resonant mode to the resonant mode with no significant disruption to the clock cycle. Further, aspects of the invention modify the supply voltage of the resonant enable/disable switches that selectively enable and disable the resonant structures of the clock distribution system to minimize the area overhead of the resonant enable/disable switches. Further, aspects of the invention use the resonant enable/disable switches to selectively disable resonant structures in a clock distribution system while the clock distribution system operates in resonant mode in the absence of some of the disabled resonant structures.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable mediums having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is an exemplary environment 10 for implementing the steps in accordance with aspects of the invention. To this extent, the environment 10 includes a server or other computing infrastructure 12 that can perform the processes described herein. In particular, the computer infrastructure 12 includes a computing device 14. The computing device 14 can be resident on a network infrastructure or computing device of a third party service provider (any of which is generally represented in FIG. 1).

Computing device 14 also includes a processor 20, memory 22A, an I/O interface 24, and a bus 26. Memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

Computing device 14 is in communication with external I/O device 28 and a storage system 22B. For example, I/O device 28 can comprise any device that enables an individual to interact with computing device 14 (e.g., user interface) or any device that enables computing device 14 to communicate with one or more other computing devices using any type of communications link. External I/O device/resource 28 may be for example, a handheld device, PDA, handset, keyboard etc.

In general, processor 20 executes computer program code (e.g., program control 44), which can be stored in memory 22A and/or storage system 22B. Moreover, in accordance with aspects of the invention, the program control 44 controls one or more modules the perform processes and steps in accordance with aspects of the invention, including a design module 105, a switch sizing module 110, a transition pattern module 112, a gate voltage module 114, a sector disable module 116, and a frequency tuning module 118. These modules can be implemented as one or more sets of program code in the program control 44 stored in memory 22A as separate or combined modules. Additionally, these modules may be implemented as separate dedicated processors or a single or several processors to provide the function of these tools.

While executing the computer program code, processor 20 can read and/or write data to/from memory 22A, storage system 22B, and/or I/O interface 24. The program code executes the processes of the invention, for example, design module 105, switch sizing module 110, transition pattern module 112, gate voltage module 114, sector disable module 116, and frequency tuning module 118. Further, data read and/or write data to/from memory 22A, storage system 22B, and/or the I/O interface 24 may include an IC design 120, element definitions 122, switch sizing information 124, transition pattern information 126, gate voltage information 128, sector disable information 130, and frequency tuning information 132. Bus 26 provides a communication link between each of the components in computing device 14.

In accordance with aspects of the invention, design module 105 is computer program code stored in, for example, memory 22A, and/or storage system 22B that, when executed by the processor 20, causes computing device 14 to model and simulate aspects of IC design 120. Design module 105 may include one or more software or hardware modules for designing, modeling, simulating, and verifying IC designs using a hardware description language, such as VERILOG or VHDL. For instance, the design module 105 may be a synthesis/placement CAD tool that reads in design definitions (e.g., VHDL), physical area constraints, timing constraints, power constraints, design library information, synthesis rules, and operating conditions. Using these various parameters, the design module 105 may iteratively determine a layout for elements in an IC design. The determined layout and associated information may be stored by the computing device 14 in storage system 22B as IC design 120. Additionally, based on the layout information, rules for timing and power (e.g., requirements, constraints, and margins), element models, and/or the operating conditions, the design module 105 may model and simulate to operation of IC design 120 in part or in its entirety. For example, design module 105 may simulate the operation of a resonant clocking system, including its timing and power consumption, based on a model of the IC design 120.

Design module 105 may be used in combination with switch sizing module 110, transition pattern module 112, gate voltage module 114, sector disable module 116, and frequency tuning module 118 in accordance with aspects of the invention. As described in more detail below, switch sizing module 110 determines the size of switches that enable/disable resonant structures. Transition pattern module 112 determines transition patterns between a non-resonant clocking and resonant clocking. The gate voltage module 114 modifies gate voltage of resonant-enable switches. The sector disable module 116 selectively disables sectors of a clock distribution system network. The frequency tuning module 118 selectively tunes the components in sectors of a clock distribution system network to achieve a desired resonant frequency.

Computing device 14 can comprise any general purpose computing article of manufacture capable of executing computer program code installed thereon (e.g., a personal computer, server, etc.). However, it is understood that computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, computing infrastructure 12 is only illustrative of various types of computer infrastructures for implementing the invention. For example, in embodiments, computing infrastructure 12 comprises two or more computing devices (e.g., a server cluster) that communicate over any type of communications link, such as a network, a shared memory, or the like, to perform the process described herein. Further, while performing the processes described herein, one or more computing devices on computing infrastructure 12 can communicate with one or more other computing devices external to computing infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 2:
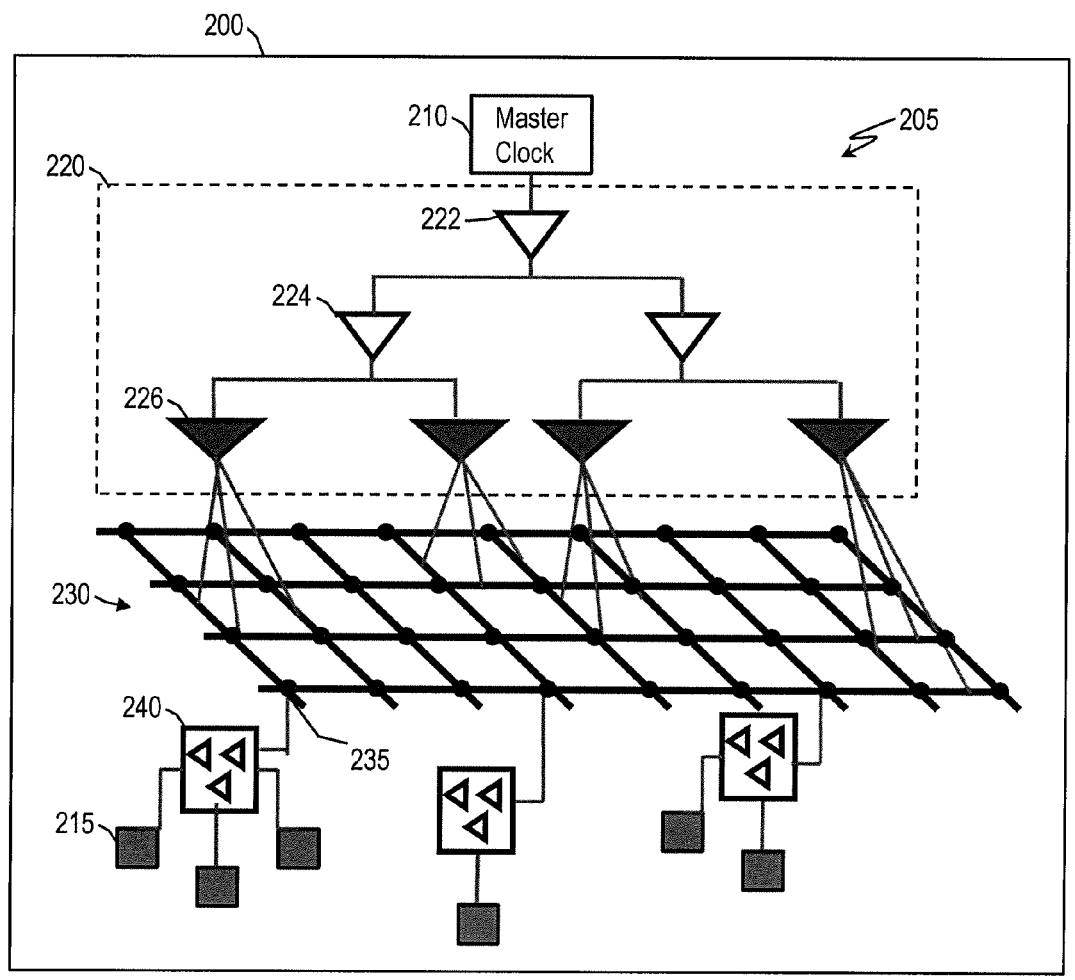
FIG. 2 shows a block diagram for an exemplary clock distribution circuit.

FIG. 2 shows a diagram of an integrated circuit 200 including an exemplary clock distribution system 205. Clock distribution system 205 can be used, for example, to distribute a clock signal to devices 215 within integrated circuit 200. Clock distribution system 205 includes a master clock 210, a buffer tree 220, a clock grid 230, and logical clock buffers and latches 240. Master clock 210 is a device that generates a periodic clock signal for synchronization logic of the integrated circuit, which is distributed to the devices 215 through clock distribution system 205. In implementations, master clock 210 may include a phase-locked loop (i.e., PLL) that generates the clock signal.

Buffer tree 220 distributes the clock signal provided by the master clock 210 to clock grid 230. Buffer tree 220 includes a number of buffers (e.g., repowering buffers) arranged in tiers. For example, a first tier of buffers, e.g., primary buffers 222, that fan out to a one or more secondary tiers of buffers, e.g., buffers 224, and to a final tier of leaf buffers, e.g., leaf buffers 226. The leaf buffers 226 provide the clock signal to the clock grid 230. Each rectangular portion of the clock grid 230 forms a sector of the clock grid that may be treated as a unit. At nodes of the clock grid 230, such as node 235, local clock buffers and latches 240 receive the clock signal from the clock grid 230 and distribute the clock signal to devices, such as devices 215. By this arrangement, the clock distribution system 205 distributes the clock signal to devices of the integrated circuit with minimum skew.

Figure 3:
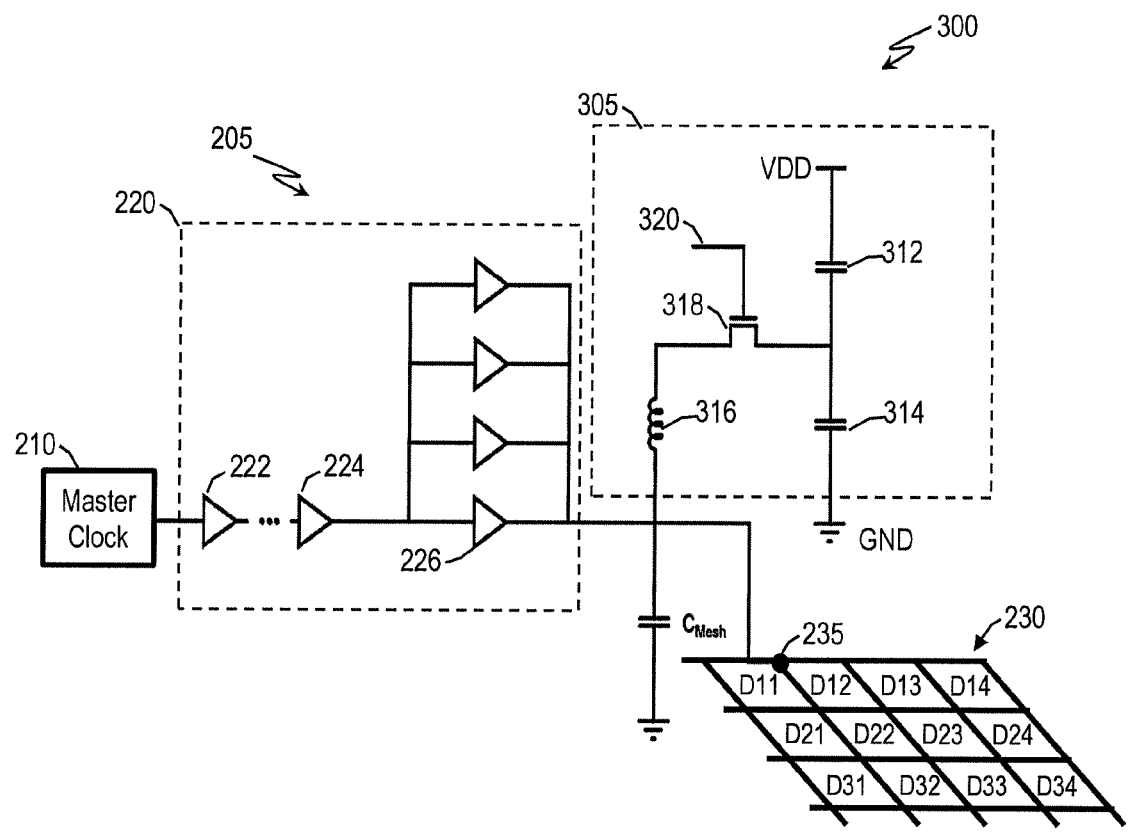
FIG. 3 shows a circuit diagram for a resonant clocking circuit in accordance with aspects of the invention.

FIG. 3 shows a diagram of an exemplary resonant clocking circuit 300. The resonant clocking circuit 300 includes clock distribution system 205 and a resonant structure 305. As described above, the clock distribution system 205 includes master clock 210, buffer tree (e.g., buffer tree 220 including, buffers 222, 224, 226), and a node 235 of clock grid 230. Additionally, resonant structure 305 includes capacitors 312, 314 and inductor 316 that form a resonant LC circuit connected to a supply voltage VDD, and to clock grid 230 of FIG. 2 via node 235.

Resonant clocking circuit 300 provides resonant clocking using a coupled LC (inductance and capacitance) oscillator circuit, which includes capacitors 312, 314 and inductor 316. Inductor 316 recycles power for use in clocking devices 215 of integrated circuit 200. For the sake of illustration, FIG. 3 only illustrates a single resonant structure 305. However, the clock grid 230 includes many such resonant structures. In embodiments, one or more instances of resonant structure 305 are uniformly distributed throughout each sector D11 . . . D34 of the clock grid 230. While FIG. 3 only shows sectors D11 . . . D34 for example, it should be understood that the number of sectors is not limited to this number of sectors and, instead, may include many more.

In accordance with aspects of the invention, the resonant structure 305 includes a switch 318. A resonant enable signal 320 activates/deactivates switch 318 which, in turn, enables/disables the resonant structure 305 by including/excluding capacitors 312, 314 of the LC circuit that are necessary for resonation. While shown in FIG. 3 for only resonant structure 305, it should be understood that each resonant structure in clock grid 230 may include such a switch 318 for receiving a corresponding resonant enable signal 320, such that each rectangular sector of the clock grid 230 contains at least one corresponding switch 318. The resonant enable signal 320 can be provided to each resonant structure 305 in the resonant clocking circuit 300 from, for example, a processor (e.g., processor 20).

Figure 4A:
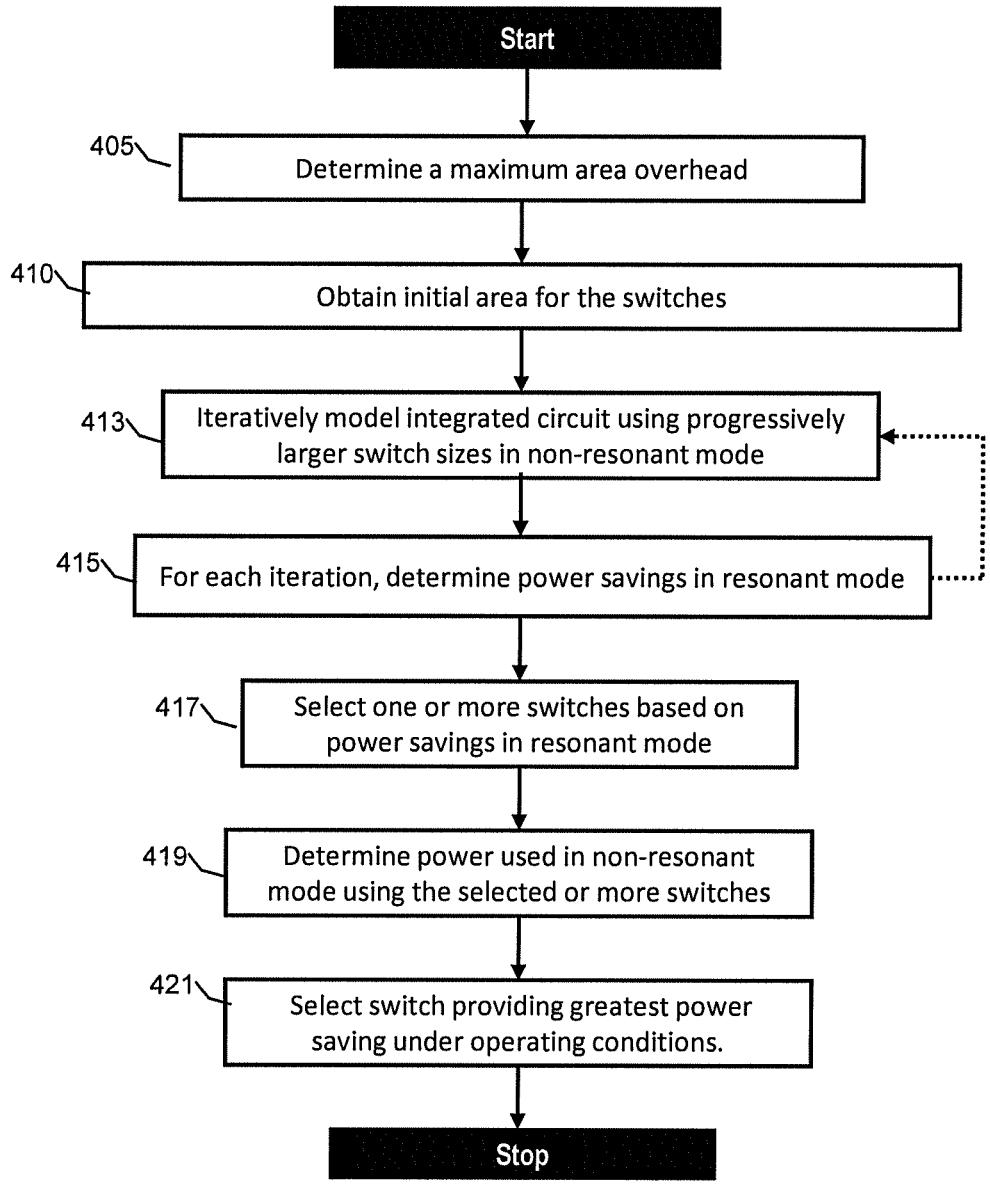
FIG. 4A shows a flow diagram of an exemplary process for determining the size of switches in resonant structures in accordance with aspects of the invention.

FIG. 4A is a flow diagram of an exemplary process for determining the size of switches (e.g., switch 318) in resonant structures (e.g., resonant structure 305) in accordance with aspects of the invention. During resonant mode (i.e., when the resonant structure is activated), when the switches are active (e.g., by resonant enable signal 320), larger switches provide less resistance in the resonant structures (e.g., resonant structure 305). The lower resistance increases the efficiency of the resonant clocking structures, which increases the power savings provided by the resonant clocking circuit (e.g., resonant clocking circuit 300).

In implementations, the switches are one or more field effect transistors (FETs). The size of the switches may be made larger by increasing the sizes of the FETs that form the switches and/or by linking a number of FETs in parallel. Using larger and/or more FETs, however, increases the power consumption in the clock distribution system during non-resonant mode (when they are not turned on) since the FET drain/source terminals connected to the clock distribution system (e.g., clock distribution system 205) are still charged even when the switches are not used for resonant clocking. In other words, the parasitic capacitance of the FET drain/source terminal draws extra power. Further, larger FETs also consume additional silicon area.

In accordance with aspects of the invention, the size of the switch (e.g., switch 218) in one or more of the resonant structures (e.g., resonant structure 305) is determined to maximize the overall power savings derived from the resonant clocking circuit (resonant clocking circuit 300). Referring to FIG. 4A, at step 405, a switch sizing module (e.g., switch sizing module 110 executed by computing device 14) determines a maximum area overhead available for a switches in a resonant structure. The maximum area overhead may be determined based on silicon area required by the switches and wiring resources required to connect the switches to the clock grid (e.g., grid 230). For example, the silicon area of a integrated circuit chip required by the devices in the switches and wiring resources required to connect the switches may be determined using an electronic computer-aided design (ECAD) application (e.g., design module 105) and models of the components of an integrated circuit (e.g., element definitions 122) to model the layout the elements of the integrated circuit design (e.g., IC design 120).

At step 410, the switch sizing module obtains an initial area and non-resonant power overhead of the switch. The switch sizing module may obtain this information from predefined design criteria (e.g., IC design 120 and element definitions 122) and/or from input from a design engineer (e.g., via a computer-user interface provided by switch sizing module 110). For example, the initial FET inductor area and non-resonant power overhead may be 1% silicon area and 5% power in non-resonant mode.

At step 413, the switch sizing module iteratively models different versions of the integrated circuit (e.g., IC design 120) with progressively larger switches. In embodiments, the switch sizing module may use larger switches that are within predefined design margins of the integrated circuit's design (i.e., within an area threshold and a power threshold in non-resonant mode defined in IC design 120). In embodiments, switch sizing module automatically selects larger switches from a predefined set of switches. Alternatively, a design engineer may select larger switches and provide the selections to the switch sizing module (e.g., via a computer-user interface provided by switch sizing module 110).

At step 415, for each iteration of switch size, the switch sizing module determines a power savings in the resonant mode. For example, for each iteration of larger switch size, the switch sizing module may simulate the operation of the integrated circuit in resonant mode, including the resonant structures, and determine the power savings (or loss) in comparison to the initial switch size of step 410. Switch sizing module may record information describing the switch sizes and the corresponding power savings (e.g., as switch size information 124 in storage system 22B.)

At step 417, the switch sizing module selects one or more of the switch sizes that provide the largest power savings in resonant mode. In embodiments, the switch sizing module may compare the power savings information for each switch determined at step 415 and select a set of switches having a size that provided the largest power savings in resonant in comparison to the initially-selected switch size. For example, the switch sizing module may select a set of five switches that are determined to consume the least power with respect to the initial switch sizes. Alternatively, a design engineer may review the stored power saving information and select of the switches that provided the largest power savings. The selection of switches may be stored for future reference (e.g., as switch sizing information 124).

At step 419, the switch sizing module determines the amount of power used for each of the selected switches in non-resonant mode. For example, for some or all of the switches selected in step 417, the switch sizing module may simulate the operation of the integrated circuit and determine the power used in non-resonant mode operation. The non-resonant mode power operation determined for each selected switch may be stored for future reference and analysis (e.g., in switch sizing information). As noted above, in non-resonant mode, larger switches consume greater power due to the overhead of charging the FET node that is connected to the clock network for each of the FETs in the switches. Thus, some of the power savings obtained from a larger switch in resonant mode may be used in non-resonant mode. As such, a balance between power savings in resonant mode operation and power lost in non-resonant mode can be determined based on how much time a particular resonant structure is expected to operate in either mode.

At step 421, the switch sizing module selects a switch from step 419 that provides the largest power saving under operating conditions. In implementations, the operating conditions are the percentage of time that the integrated circuit is expected to operate in resonant mode (e.g., 45%) and the switch sizing module selects the switch having a size that maximizes the overall power reduction. The computing device may obtain operating condition information from pre-defined design criteria (e.g., IC design 120) and/or from input from a design engineer (e.g., via a computer-user interface of the design module.) The percentage of time that the integrated circuit is expected to operate in resonant mode may be based on historical information of clock distribution systems used in similar types of chips or on historical information of expected workloads of the systems using similar types of chips.

Figure 4B:
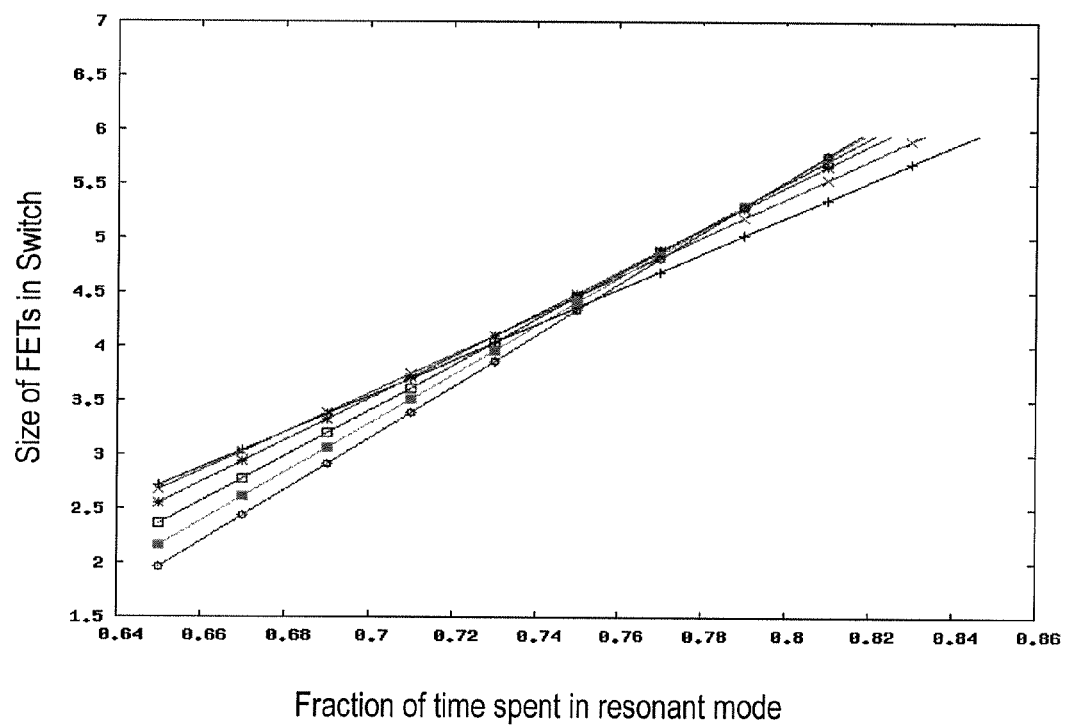
FIG. 4B is graph illustrating an exemplary comparison between a fraction of time spent by resonant structures in resonant mode versus sizes of switches in the resonant structures in accordance with aspects of the invention.

FIG. 4B is graph illustrating an exemplary comparison between fractions of time spent in resonant mode (x-axis) versus sizes of FETs in switch (y-axis), for various switch sizes in resonant structures in accordance with aspects of the invention. As evident from FIG. 4B, the switch sizing module may select larger FETs in the switches (e.g., switch 318) for integrated circuits that spend a greater amount of time in resonant mode since larger FETs provide less resistance in the LC circuit connected to a clock distribution system, during resonant mode and, as such, provide a more efficient integrated circuit. Conversely, for integrated circuits that spend a relatively lower amount of time in resonant mode, the switch sizing module may select smaller switches since the smaller switches have lower parasitic capacitance in non-resonant mode.

Figure 5A:
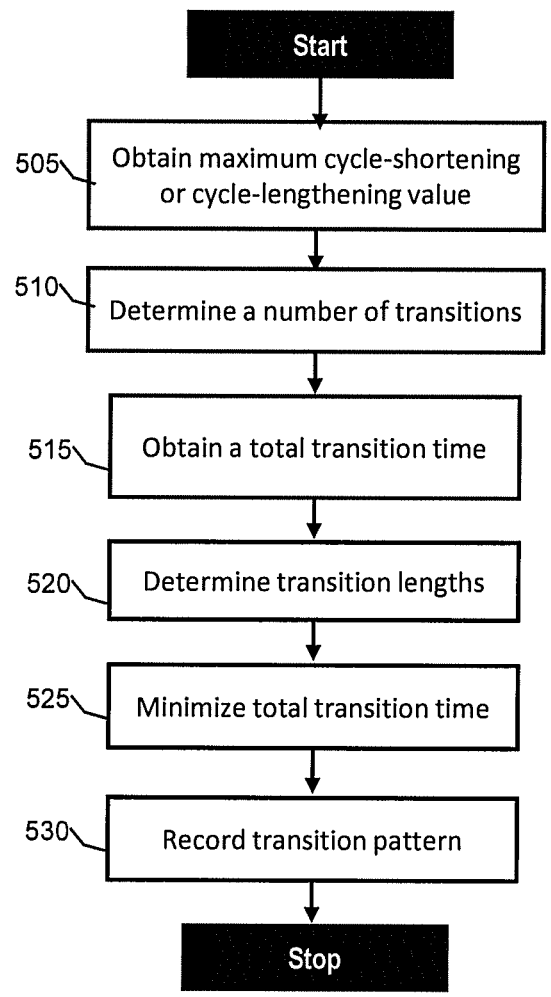
FIG. 5A shows a flow diagram of an exemplary process for determining transition pattern between a non-resonant clocking and resonant clocking in accordance with aspects of the invention.

FIG. 5A is a flow diagram of an exemplary process for determining a transition pattern between non-resonant clocking and resonant clocking in accordance with aspects of the invention. In embodiments, the transition from non-resonant mode to resonant mode is performed in gradual steps to ensure that disruptions to the period of a clock signal are minimized. In implementations, the transition pattern is determined by optimizing the duration (e.g., shortening or lengthening) of the steps, which corresponds to inclusion or removal of resonant energy into and out of the clock distribution system during transitions to and from resonant and non-resonant modes.

According to aspects of the invention, the transition pattern is controlled by the switches (e.g., switch 318) in each resonant structure (e.g., resonant structure 305), wherein the switches are controllable to progressively allow more or less current. In implementations, the switches include of a number of FETs connected in parallel such that each additional FET progressively activated within the switches incrementally increases the total energy flow between the sources and drains of the FETs that feeds the resonant structure. In such implementations, the number of transition increments (i.e., steps) included in the transition pattern can be based on the number of FETs included in the switch of the resonant structure, the routing resources required to control each transition increment within the integrated circuit, and the percentage of the full switch size to which each individual transition increment corresponds. For example, a transition pattern consists of a gradual transition from non-conductive state to fully conductive state using a programmable switch.

Referring to FIG. 5A, at step 505, a transition pattern module (e.g., transition pattern module 112 executed by computing device 14) obtains a maximum cycle-shortening or cycle-lengthening value that can be tolerated by an integrated circuit (e.g. integrated circuit 200) including a resonant clocking circuit (e.g., resonant clocking circuit 300). In implementations, the transition pattern module may retrieve the maximum cycle-shortening/lengthening value from pre-determined design parameters for an integrated circuit design (e.g., IC design 120). The integrated circuit design may include timing constraints including an expected clock period and an allowable amount of deviation from the expected clock period. For example, if the expected clock period is 250 picoseconds (ps), then a 4% shortening of the clock cycle corresponds to 10 ps. Alternatively, a design engineer may provide the maximum cycle-shortening or the cycle-lengthening value to the transition pattern module (e.g., via a compute-user interface provided by transition pattern module 112).

At step 510, the transition pattern module determines the number of transitions possible between the off state and the on state of the resonant structures (e.g., resonant structures 305). In implementations, the number of transitions correspond to increments (i.e., steps) included in the programmable switch (e.g., switch 318). The transition pattern module may obtain this information from information describing the switch (e.g., switch sizing information 124 determined at step 421) and/or from input from a design engineer (e.g., via a computer-user interface of the transition pattern module.) For example, a switch may include eight FETs that can be individually activated by a controller (e.g., processor 20) to provide eight discrete steps in a transition pattern.

At step 515, the transition pattern module obtains the total transition time available to complete the transition pattern. This total transition time is a constraint on the system and is set by a design engineer. The value of the total transition time may be predefined and stored in a design specification (e.g., IC design 120).

At step 520, the transition pattern module determines the length of each transition increment. In implementations, the transition pattern module determines an initial transition length for each increment by dividing the total transition time (from step 515) by the total number of transitions (from step 510). Thus, in implementations using switches having a number of FETs, the length of each transition increment corresponds to a total number of FETs in the switches.

At step 525, the transition pattern module minimizes the transition time. In embodiments, the transition pattern module optimizes the transition pattern to minimize the total transition time by setting each increment of the transition pattern while ensuring that the cycle shortening and lengthening for all steps remains below the value determined in step 505. The optimal width per step (transition moving into the resonant mode) preferably grows superlinearly with time. By doing so, each successive increment uniformly introducing resonant energy into the grid, which minimizes clock disturbance in any one increment.

The transition pattern module determines the total time required to change between non-resonant mode and resonant mode (i.e., from resonant mode to non-resonant mode, or from non-resonant mode to resonant mode). In embodiments, the transition pattern module maximizes the shortening of the maximum value of transition over the number steps of the transition pattern. Alternatively, the transition pattern module minimizes both the total transition time and the total cycle shortening/lengthening or the maximum cycle shortening/lengthening.

At step 530, the transition pattern module records the determined transition pattern. For example, the transition pattern may be recorded as transition pattern information (e.g., transition pattern information 126). Integrated circuits (e.g., integrated circuit 200) produced according to a design (e.g., IC design 120) including resonant clocking circuit (e.g., resonant clocking circuit 300) may be provided with a copy of the transition pattern information for controlling switching between resonant and non-resonant modes. For example, the integrated circuit maybe a system-on-chip including a non-volatile memory that stores a copy of the determined transition pattern information.

Figure 5B:
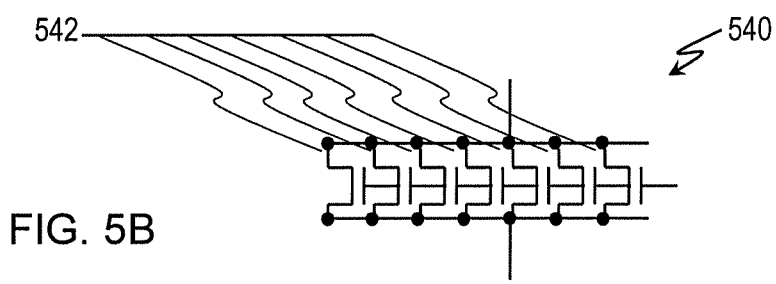
FIG. 5B shows an exemplary switch used for implementing an incremental transition in accordance with aspects of the invention.

FIG. 5B shows an exemplary switch 540 used for implementing an incremental transition in accordance with aspects of the invention. In embodiments, switch 540 includes one or more FETs 542. Information describing the physical size (i.e., chip area), performance characteristics (e.g., source-drain resistance) and constraints (e.g., voltage tolerance threshold) may be stored in one or more FET models (e.g., as element definitions 122 in storage system 22B). The gates of the FETs 542 may be individually controlled by a controller included in the integrated circuit (e.g., integrated circuit 200) to activate each FET 542 in accordance with the determined transition pattern information. The number of FETs 542 included in the switch may be limited by the size of the switch 540, as described above with respect to FIGS. 4A and 4B. For example, the switch in FIG. 5B has seven FETs 542. Switch 540 may be used as switch 318 in FIG. 3.

Figure 5C:
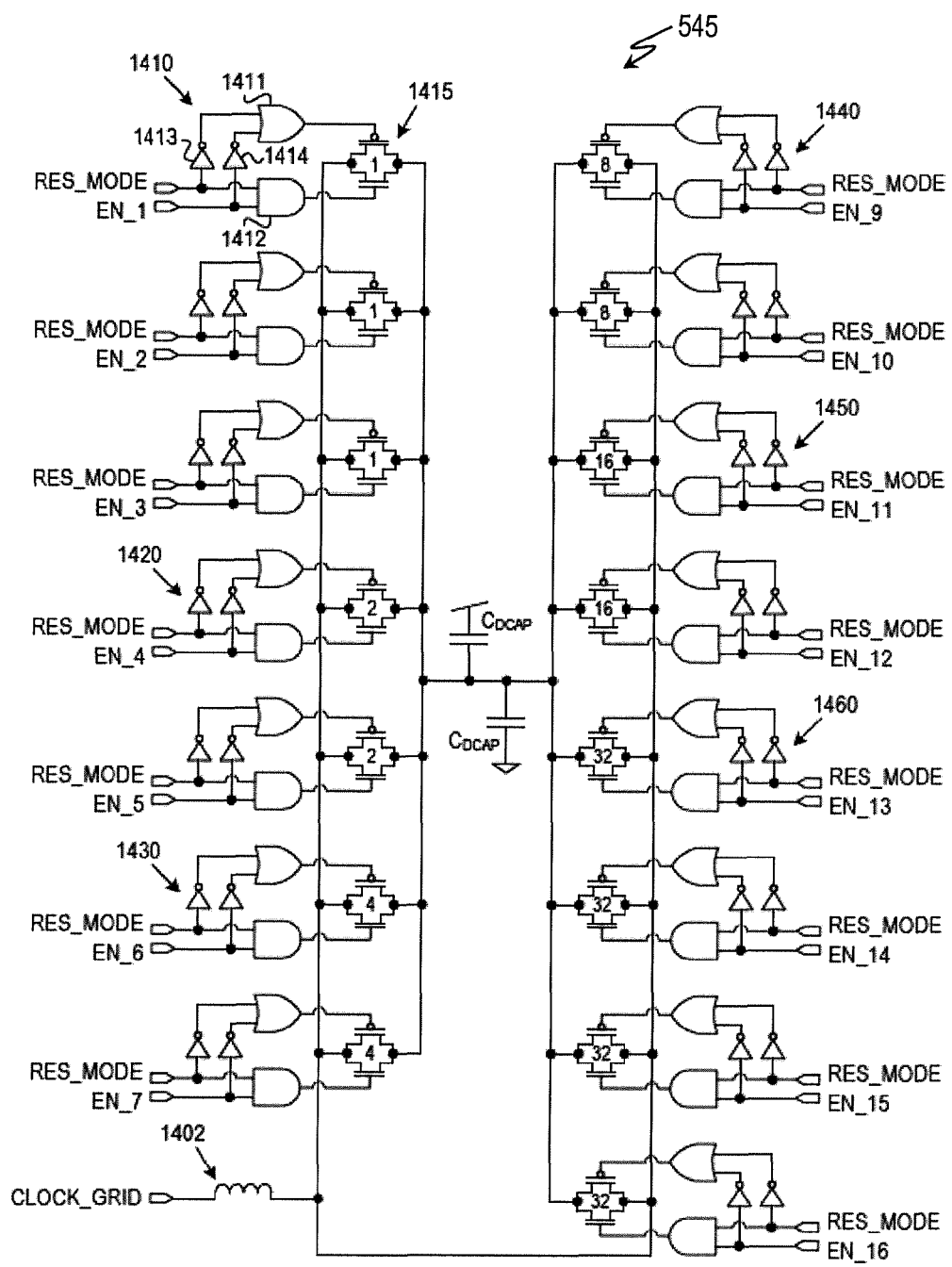
FIG. 5C depicts an exemplary switch device used for implementing an incremental transition in accordance with embodiments of the invention.

FIG. 5C depicts an exemplary switch device 545 used for implementing an incremental transition in accordance with embodiments of the invention. The switch device 545 includes a plurality of steps, such as steps 1410, 1420, 1430, 1440, 1450, 1460. In step 1410, inverter 1413 receives a resonant mode (RES_MODE) signal, and inverter 1414 receives an enable (EN_1) signal. OR gate 1411 receives as input the inverted resonant mode signal and the inverted enable signal and provides its output to the gate of the PFET in switch component 1415. AND gate 1412 receives the resonant mode signal and the enable signal and provides output to the gate of the NFET in switch component 1415.

If the resonant mode signal is de-asserted (low) and the enable signal EN_1 is de-asserted (low), the output of OR gate 1411 is high and the output of AND gate 1412 is low, in which case both the PFET and the NFET of switch component 1415 are in an off state. If the resonant mode signal is de-asserted (low) and the enable signal EN_1 is asserted (high), the output of OR gate 1411 is high and the output of AND gate 1412 is low, in which case both the PFET and the NFET of switch component 1415 are in an off state. If the resonant mode signal is asserted (high) and the enable signal EN_1 is de-asserted, the output of OR gate 1411 is high and the output of AND gate 1412 is low, in which case both the PFET and the NFET of switch component 1415 are in an off state. If the resonant mode signal is asserted and the enable signal EN_1 is asserted, the output of OR gate 1411 is low and the output of AND gate 1412 is high, in which case both the PFET and the NFET of switch component 1415 are in an on state. Thus, switch component 1415 is turned on when the resonant mode signal is asserted and the enable signal EN_1 is asserted.

When step 1410 turns switch component 1415 on, current flows through inductor 1402 (similar to inductor 316) and through switch component 1415 into a clock grid (e.g., clock grid 230). Steps 1420, 1430, 1440, 1450, 1460 are controllable in a similar manner. Thus, control logic (e.g., from sector disable module 116 or sector disable module 116) can turn switch device 545 on in increments by asserting the enable signals EN_1, EN_2, EN_3 . . . EN_16. Switching of switch device 545 is, therefore, fully programmable. As control logic enables each step (e.g., steps 1410, 1420, 1430, 1440, 1450, and 1460), conductivity of switch device 545 increases and resistance decreases. Notably, steps 1410, 1420, 1430, 1440, 1450, and 1460 have sizes of 1, 2, 4, 8, 16, and 32. For instance, step 1410 has a step size of 1, step 1420 has a step size of 2, step 1430 has a step size of 4, step 1440 has a step size of 8, step 1450 has a step size of 16, and step 1460 has a step size of 32. These sizes are exemplary and other sizes can be used for one or more of the steps.

Figure 5D:
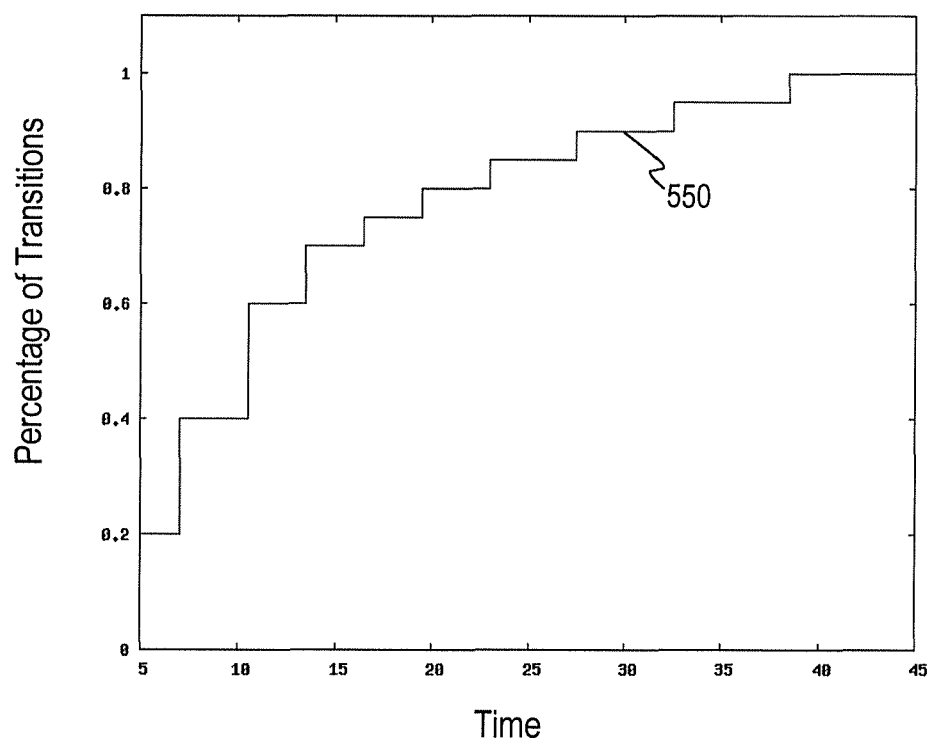
FIG. 5D shows a graph illustrating an exemplary transition scheme in accordance with aspects of the invention.

FIG. 5D is a graph illustrating an exemplary transition pattern in accordance with aspects of the invention. The illustrated transition pattern may represent that recorded by the transition pattern module at step 530, as described in FIG. 5A. The x-axis of the graph represents time. The y-axis represents the percentage of the total number of FETs in a switch of a resonant structure are turned on, wherein "0.2" represents the switch being partially turned-on and "1" represents the switch entirely turned on. The line 550 plotted in FIG. 5D depicts percentage of total FETs turned on at different times. The percentage of the FETs turned on corresponds to the conductivity of the switch as FETs in the switch are activated.

FIGS. 5B, 5C, and 5D are exemplary and embodiments of the invention are not limited to the particular switch or transition pattern illustrated in these examples. Different switches may add different amounts of conductivity and have different transition patterns. Further, FIGS. 5A, 5B, 5C, and 5D describe a digital embodiment in which power carried by a switch is increased by incrementally adding FET's. However, embodiments of the invention may, instead, be analog in which gate voltage of single FET is continuously increased over time.

Figure 6:
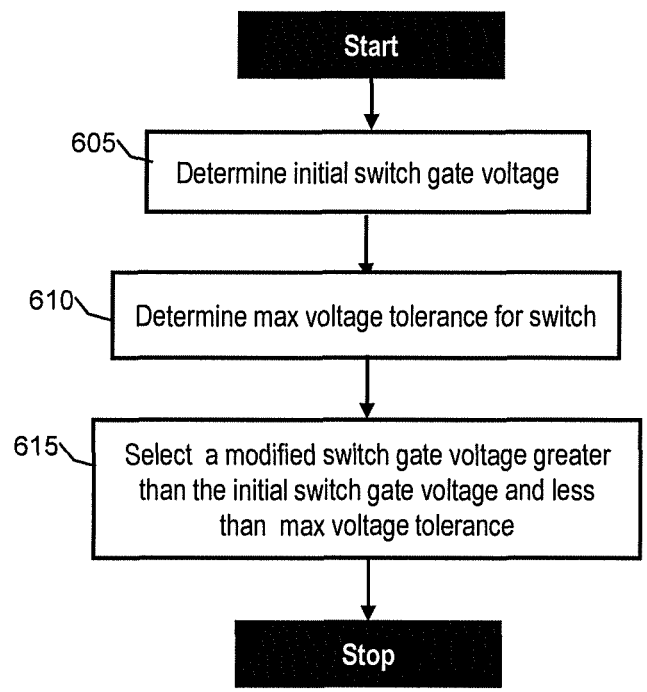
FIG. 6 shows a flow diagram of an exemplary process for modifying gate voltage of resonant-enable switches in accordance with aspects of the invention.

FIG. 6 is a flow diagram of an exemplary process for modifying gate voltage of resonant-enable switches in accordance with embodiments of the invention. Greater area efficiency in the use of integrated circuit area can be achieved by using smaller switches (e.g., switch 318) in resonant structures (e.g., resonant structure 305), and a gate voltage that is higher than the nominal supply voltage (e.g., VDD). This is possible because, when the switches are fully-on (e.g., FETs activated) and their capacitors (e.g., capacitors 312, 314) are charged, the voltage at the source and drain remains substantially at one-half the value of the supply voltage (e.g., VDD/2) of the switches. Thus, a higher voltage can be maintained on the gates of the switches without exceeding the reliability tolerance of the switches with respect to gate-to-source or gate-to-drain potential. As such, in implementations where the switches are field-effect transistors (FETs), a voltage greater than the supply voltage can be provided to the gates of the FETs (i.e., voltage of resonant enable signal is greater than VDD). Applying an increased voltage to the gate, in turn allows the use of smaller FETs that have the current-carrying capacity of comparatively larger FETs. Accordingly, implementations of the invention increase the size of FETs without exceeding space limitations (i.e., chip area thresholds) and without exceeding that power threshold in non-resonant mode.

Referring to FIG. 6, at step 605, a gate voltage module (e.g., gate voltage module 114 executed by computing device 14) determines the initial gate voltage (e.g., VDD) for the resonant-mode switch. At step 610, the gate voltage module determines the maximum voltage tolerance for the switch. The gate voltage module may determine this information from predefined design criteria (e.g., IC design 120), predefined device information for the FETs of the switch (e.g., in element definitions 122), and/or from input from a design engineer (e.g., via a computer-user interface of the gate voltage module). For example, the reliability-based tolerance for FET gate voltage (e.g., for SOI) may be specified as Vgate−Vsource/drain.

At step 615, the gate voltage module selects a gate voltage for the switches that is greater than the supply voltage determined at step 605 and less than maximum voltage tolerance determined at step 610. The gate voltage module may select the gate voltage from predefined design criteria (e.g., stored in element definitions 122) and/or from input from a design engineer (e.g., via a computer-user interface of the design module). The selected gate voltage value may be stored as gate voltage information (e.g., in gate voltage information 128). Based on the determined gate voltage information, integrated circuit design (e.g., IC design 120) information may be modified to provide the selected voltage to the switch. In embodiments, the increased voltage at the gates of the switches is provided using a charge pump or similar circuit.

Figure 7A:
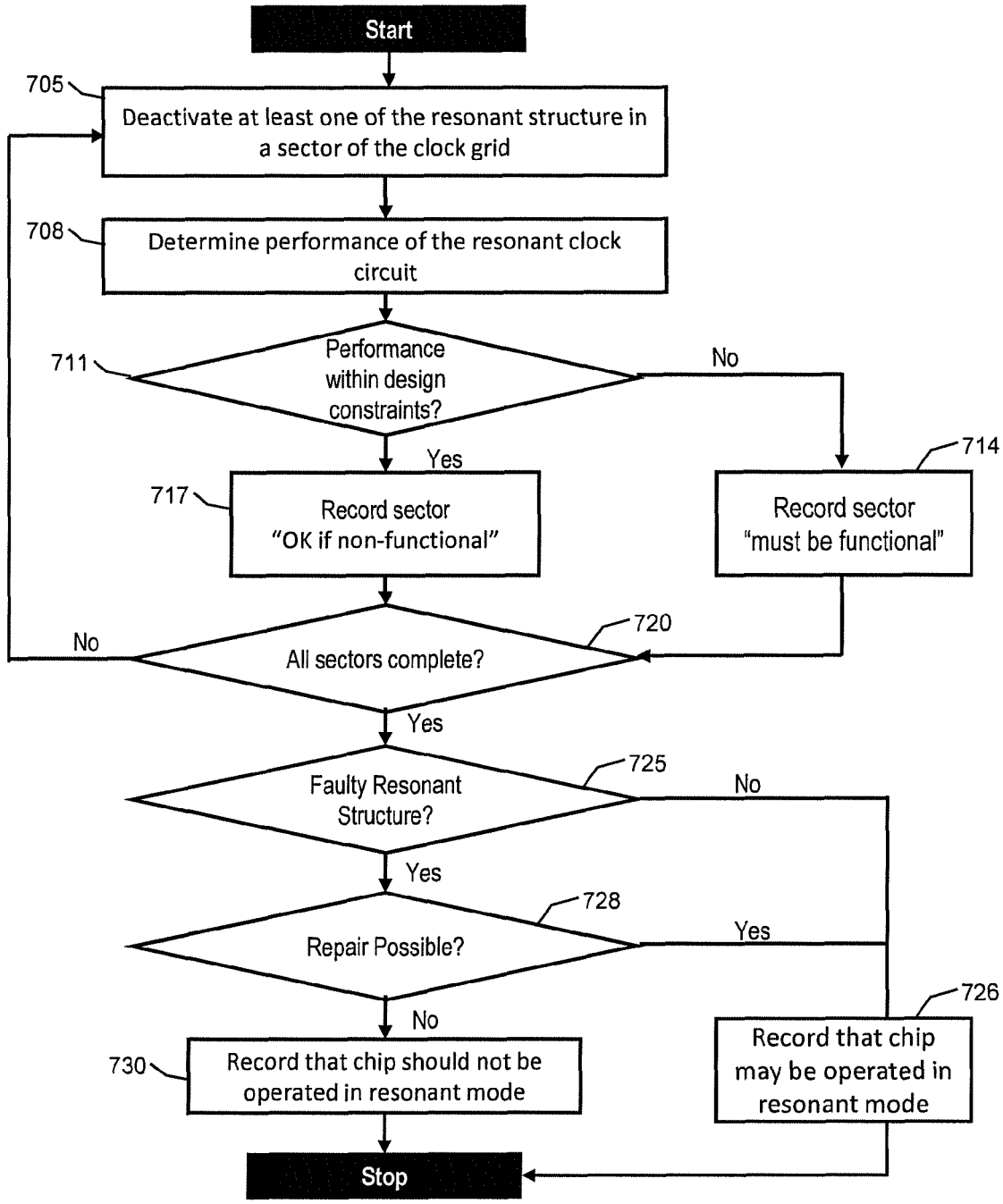
FIG. 7A shows a flow diagram of a process for selectively disabling sectors of a resonant clocking circuit in accordance with aspects of the invention.

FIG. 7A is a flow diagram of an exemplary process for selectively disabling sectors of resonant clocking circuit in accordance with aspects of the invention. Due to manufacturing variations and/or defects, some of the resonant structures in an integrated circuit may not function as designed. For example, some capacitors (e.g., capacitors 312, 314) might be defectively formed and, as a result, the resonant structure (e.g., resonant structure 305) of which they are a part may not function properly. However, because resonant structures may be distributed throughout an integrated circuit in accordance with aspects of the invention, the integrated circuit includes redundant resonant structures. Accordingly, the loss of some individual resonant structures may be tolerable. Even so, variations in loads make some sectors of the overall resonant clocking circuit more sensitive to such defects than others. Consequently, skew, slew, or cycle compression may occur at a node (e.g., node 235) and result in a failure of the resonant clocking circuit. For example, differences in local loads may cause the clock circuit in resonant mode to be particularly sensitive to the presence of specific inductor and capacitor pairs. If these capacitors within the resonant circuit turn out to be defective after the integrated circuit is manufactured, then for safe operation, the integrated circuit should not be operated in resonant mode.

According to aspects of the invention, the sensitivity of the clock distribution system (e.g., clock distribution system 205) is analyzed with respect to individual resonant structures (e.g., resonant structures 305) to determine whether the loss of any particular resonant structure would impair the ability of an integrated circuit to run in resonant mode. If any such individual resonant structures do exist and are subsequently found to be defective during hardware testing, then the integrated circuit is identified as being incapable of running in resonant mode.

Referring to FIG. 7A, at step 705, for each sector (e.g., D11 . . . D34) of clock grid (e.g., clock grid 230), a sector disable module (e.g. sector disable module 116 executed by computing device 14) deactivates resonant circuits in that sector (in the case where there is more than one resonant circuit per sector). For example, the sector disable module may control a resonant enable/disable switch (e.g., switch 318) to deactivate a selected resonant structure (e.g., resonant structure 305 in sector D11).

At step 708, the sector disable module determines the performance of the clock distribution system when operating with the selected sector deactivated. In implementations, the parameters of performance include skew, slew, cycle compression. The determined parameters may be stored as sector disable information (e.g., as sector disable information 130 in storage device 22B) in association with an identifier of the selected sector. The sector disable module may determine the performance parameters of the clock distribution system in both steady-state performance in resonant mode and at the transition from non-resonant mode to resonant mode and back. This evaluation can be performed either by simulation of an integrated circuit design (e.g. IC design 120) or by hardware tests of, for example, the integrated circuit.

At step 711, the sector disable module determines whether the performance (e.g., skew, slew, and/or cycle compression) determined at step 708 is within design constraints. In embodiments, the sector disable module compares the performance parameters stored in sector disable information with corresponding constraints included the integrated circuit design (e.g., IC design 120). If performance parameters are determined to violate the constraints of the integrated circuit's design parameters, at step 714, information for the deactivated sectors is recorded in a table of repair possibilities (i.e., a "Repair Possibilities Table") in the sector disable information indicating that the deactivated sector must be functional. For example, if the performance is determined to be outside design constraints, at step 714, sector disable module records a "0" for the sector in the Repair Possibilities Table.

If performance parameters are determined to not violate the constraints of the integrated circuit's design parameters, at step 717, information is recorded in the Repair Possibilities Table in the sector disable information indicating that the deactivated sector is not required to be functional. For example, if the performance is determined to be within design constraints, at step 717, sector disable module records a "1" for the sector in the Repair Possibilities Table. At step 720, sector disable module determines whether steps 705 . . . 717 have been completed for all sectors (e.g., D11 . . . D34) of the resonant clocking circuit. If not, the process returns to step 705 and repeats for the next, untested sector.

At step 725, the sector disable module determines if a faulty resonant structure exists within the resonant clocking circuit. For example, bench testing of the integrated circuit may determine that a capacitor in a particular resonant structure does not properly charge and/or discharge due to a manufacturing defect. If the integrated circuit does not include a faulty resonant structure, then at step 726 the sector disable module records information in association with the integrated circuit that the particular integrated circuit may be operated in resonant mode.

If a faulty resonant circuit is determined to be in the integrated circuit, then at step 728 it is determined whether repair is possible based on the evaluation information recorded in steps 714 and 717. If the corresponding information for the sector including a faulty resonant circuit indicates that the sector is not required to be functional (e.g., a "1" is recorded in the corresponding cell of the Repair Possibilities Table), then at step 726 the sector disable module records information in association with the integrated circuit that the particular integrated circuit may be operated in resonant mode. Otherwise, if the corresponding information for the sector including a faulty resonant structure indicates that the sector must be functional (e.g., a "0" is recorded in the corresponding cell of the Repair Possibilities Table), then at step 730 the sector disable module records information in association with the integrated circuit that the particular integrated circuit should not be operated in resonant mode.

Figure 7B:
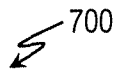
FIG. 7B shows a data structure illustrating an exemplary Repair Possibility Table for a resonant clocking circuit in accordance with aspects of the invention.

FIG. 7B is a data structure illustrating an exemplary Repair Possibility Table 700 for a resonant clocking circuit in accordance with aspects of the invention. In implantations, the Repair Possibility Table 70 is a matrix of cells in which each cell corresponds to a sector of the clock grid (e.g., clock grid 305) of a resonant clocking circuit (e.g., resonant clocking circuit 300). A value stored in each cell indicates whether or not the resonant structure(s) in the corresponding sector must be functional. (e.g., "0" or "1"). The Repair Possibility Table 700 is depicted as a matrix of cells, however, implementations of the invention are not limited to this example and other structures can be used instead (e.g., 2×N table mapping each sector to a corresponding repair possibility value). For example the table 700 indicates that the integrated circuit cannot be safely operated in resonant mode when sectors D23 and D31 (which contain 0's) are disabled from resonant operation.

Figure 8:
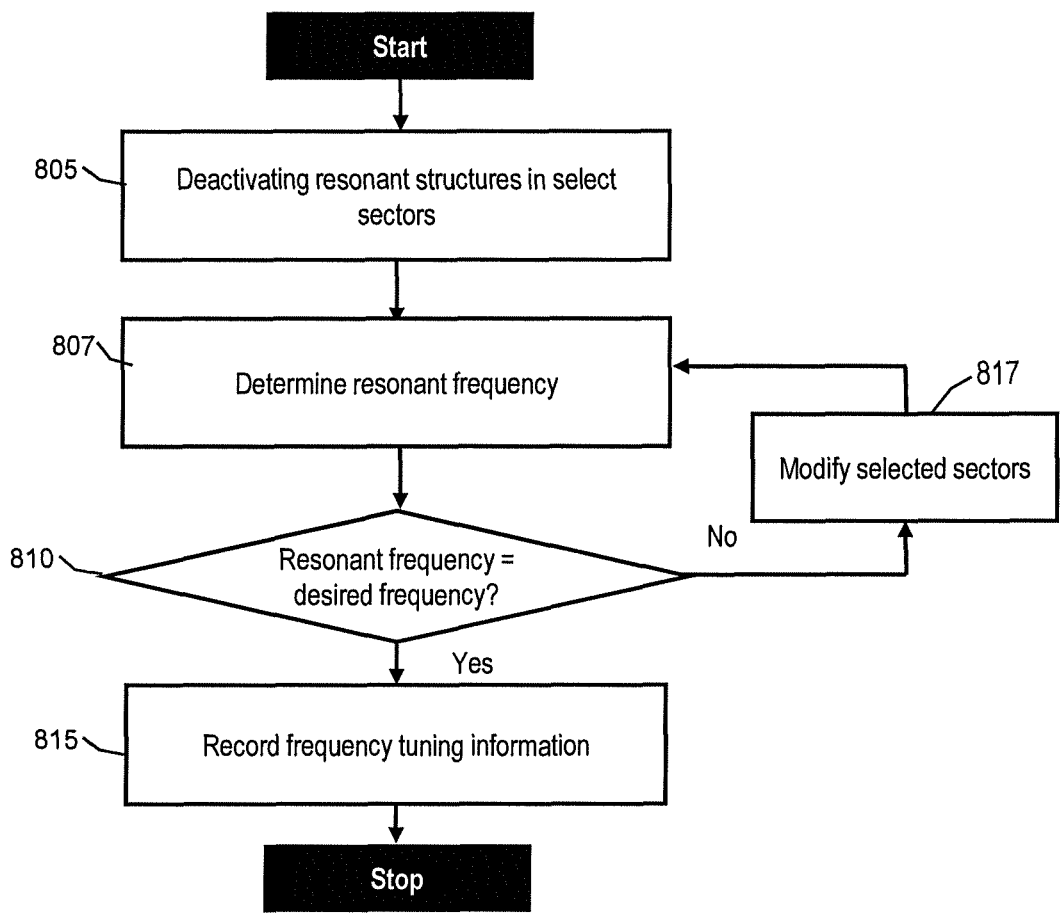
FIG. 8 shows a flow diagram of an exemplary process for selectively tuning a frequency of a resonant clocking circuit in accordance with aspects of the invention.

FIG. 8 is a flow diagram of an exemplary process for selectively tuning a frequency of a resonant clocking circuit (e.g., resonant clocking circuit 300) in accordance with aspects of the invention. Resonant frequency varies as the inverse of the square root of the product of capacitance (C) and inductance (L). Therefore, if the capacitors (e.g., capacitors 312, 314) and inductors (e.g., inductor 316) in an resonant LC tank are arranged in parallel, as they are, for example, in the resonant circuit shown in FIG. 3, fewer inductors and capacitors results in larger C and L and thus lower resonant frequency. With a given set of inductors and capacitors and loads on the clock grid (e.g., clock grid 230), aspects of the invention disable selected resonant structures (e.g., resonant structure 305) and, thereby, change the resonant frequency of a clock grid to improve power efficiency of a resonant clocking circuit at a particular operating frequency. For example, it is possible to selectively enable a specific set or pattern (e.g., a "checkerboard" pattern) of resonant circuits for improved power efficiency of the resonant clocking circuit at a particular operating frequency.

Referring to FIG. 8, at step 805, a frequency tuning module (e.g., frequency tuning module 118 executed by computing device 14) deactivates selected sectors (e.g., sectors D11 . . . D34) of a clock grid (e.g., clock grid 230). In implementations, as an initial solution, the frequency tuning module deactivates predefined sectors of the clock grid in a pattern. For example, the initial solution may deactivate the sectors in a checkerboard pattern. The predefined sectors (or pattern of sectors) may be stored in frequency tuning information (e.g., frequency tuning information 132 stored in storage device 22B).

At step 807, the frequency tuning module determines the resonant frequency of the resonant clocking circuit with the selected sectors deactivate. The determination of the resonant frequency resulting from the deactivated sectors may be made by simulating the integrated circuit using, for example, an ECAD application (e.g., design module 105). Additionally or alternatively, the determination of the resonant frequency resulting from the deactivated sectors may be made by hardware testing of manufactured integrated circuits.

At step 810, the frequency tuning module determines whether the deactivated sectors result in a desired clock frequency. The frequency tuning module may obtain the desired clock frequency may from predefined design information (e.g., IC design 120) or this information may be stored in the frequency tuning information. Alternatively, a design engineer may provide the desired clock frequency (e.g., via a computer-user interface provided by the frequency tuning module).

If, at step 810, the frequency tuning module determines that currently deactivated sectors of the clock grid results in the resonant clocking circuit operating at a resonant frequency that is substantially the same as the desired frequency, then at step 815 the information describing the currently deactivated sectors is recorded in the frequency tuning information. This information may be used by a processor (e.g., processor 20) to control switches (e.g., switch 318) in the selected structures and thereby control an integrated circuit to function at the resonant frequency determined by the frequency tuning module If at step 810, the frequency tuning module determines that the currently deactivated sectors of the clock grid do not result in the resonant clocking circuit operating at a resonant frequency that is substantially the same as the desired frequency, then at step 817 the frequency tuning module modifies the sectors previously deactivated at step 805 and the process iteratively returns to step 807. In implementations, modifying the sectors includes iteratively enabling or disabling one or more of the sectors of the previous set of deactivated sectors. Alternatively, the modifying the sectors includes selecting a different predefined pattern of sectors having a different density of deactivated sectors than the previously selected pattern.

Figure 9:
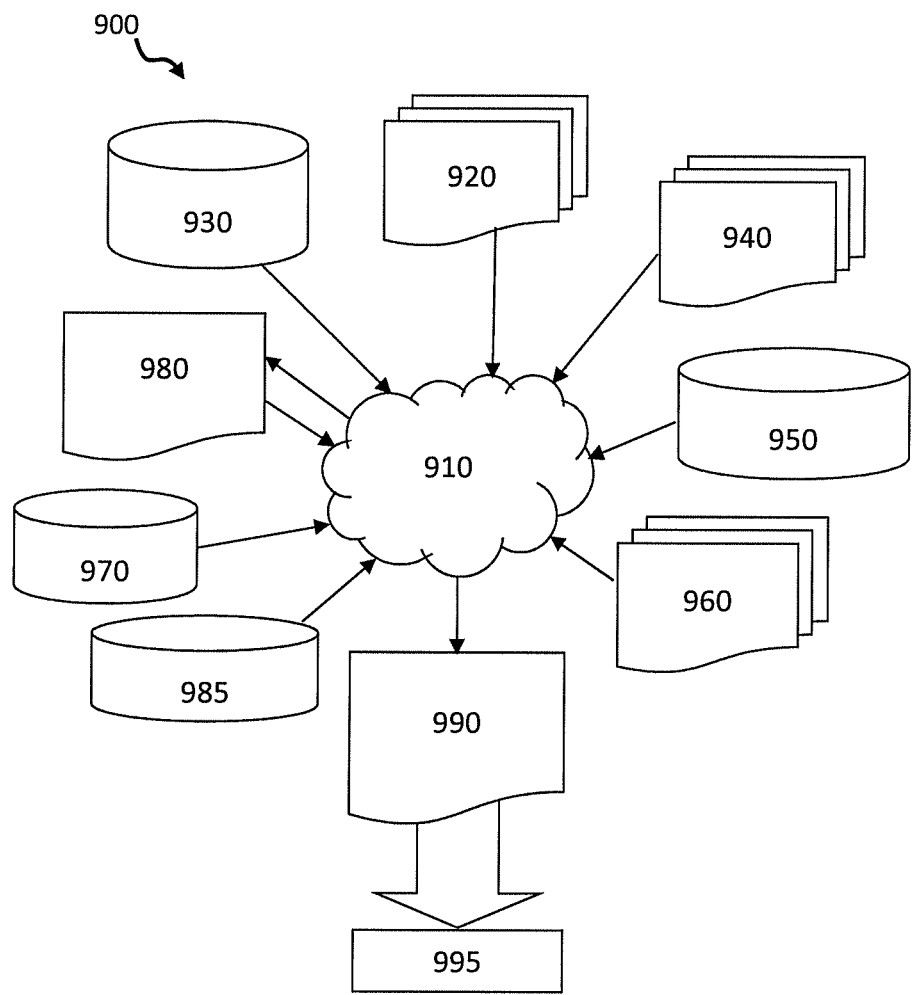
FIG. 9 shows a flow diagram of a design process used in semiconductor design, manufacture, and/or test.

FIG. 9 is a flow diagram of a design process used in semiconductor design, manufacture, and/or test in accordance with aspects of the invention. FIG. 9 shows a block diagram of an exemplary design flow 900 used for example, in semiconductor IC logic design, simulation, test, layout, and manufacture. Design flow 900 includes processes, machines and/or mechanisms for processing design structures or devices to generate logically or otherwise functionally equivalent representations of the design structures and/or devices described above and shown in FIGS. 2, 3, and 5B. The design structures processed and/or generated by design flow 900 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 900 may vary depending on the type of representation being designed. For example, a design flow 900 for building an application specific IC (ASIC) may differ from a design flow 900 for designing a standard component or from a design flow 900 for instantiating the design into a programmable array, for example a programmable gate array (PGA) or a field programmable gate array (FPGA) offered by Altera® Inc. or Xilinx® Inc.

FIG. 9 illustrates multiple such design structures including an input design structure 920 that is preferably processed by a design process 910. Design structure 920 may be a logical simulation design structure generated and processed by design process 910 to produce a logically equivalent functional representation of a hardware device. Design structure 920 may also or alternatively comprise data and/or program instructions that when processed by design process 910, generate a functional representation of the physical structure of a hardware device. Whether representing functional and/or structural design features, design structure 920 may be generated using electronic computer-aided design (ECAD) such as implemented by a core developer/designer. When encoded on a machine-readable data transmission, gate array, or storage medium, design structure 920 may be accessed and processed by one or more hardware and/or software modules within design process 910 to simulate or otherwise functionally represent an electronic component, circuit, electronic or logic module, apparatus, device, or system such as those shown in FIGS. 2, 3, and 5B. As such, design structure 920 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 910 preferably employs and incorporates hardware and/or software modules for synthesizing, translating, or otherwise processing a design/simulation functional equivalent of the components, circuits, devices, or logic structures shown in FIGS. 2, 3, and 5B to generate a netlist 980 which may contain design structures such as design structure 920. Netlist 980 may comprise, for example, compiled or otherwise processed data structures representing a list of wires, discrete components, logic gates, control circuits, I/O devices, models, etc. that describes the connections to other elements and circuits in an integrated circuit design. Netlist 980 may be synthesized using an iterative process in which netlist 980 is resynthesized one or more times depending on design specifications and parameters for the device. As with other design structure types described herein, netlist 980 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 910 may include hardware and software modules for processing a variety of input data structure types including netlist 980. Such data structure types may reside, for example, within library elements 930 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 940, characterization data 950, verification data 960, design rules 970, and test data files 985 which may include input test patterns, output test results, and other testing information. Design process 910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 910 without deviating from the scope and spirit of the invention. Design process 910 may also include modules for performing standard circuit design processes such as timing analysis, verification, design rule checking, place and route operations, etc.

Design process 910 employs and incorporates logic and physical design tools such as HDL compilers and simulation model build tools to process design structure 920 together with some or all of the depicted supporting data structures along with any additional mechanical design or data (if applicable), to generate a second design structure 990.

Design structure 990 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 920, design structure 990 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 2, 3, and 5B. In one embodiment, design structure 990 may comprise a compiled, executable HDL simulation model that functionally simulates the devices shown in FIGS. 2, 3, and 5B.

Design structure 990 may also employ a data format used for the exchange of layout data of integrated circuits and/or symbolic data format (e.g. information stored in a GDSII (GDS2), GL1, OASIS, map files, or any other suitable format for storing such design data structures). Design structure 990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 2, 3, and 5B. Design structure 990 may then proceed to a stage 995 where, for example, design structure 990: proceeds to tape-out, is released to manufacturing, is released to a mask house, is sent to another design house, is sent back to the customer, etc.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method for providing a resonant clocking circuit for reducing power consumed by a clock distribution system in an integrated circuit, the method comprising:
    creating a clock grid including a plurality of resonant structures distributed in the clock grid;
    providing a plurality of programmable switches that switch a respective one of the plurality of resonant structures between a non-resonant mode and a resonant mode, each of the plurality of programmable switches being controllable to progressively energize the respective one of the plurality of resonant structures;
    determining a transition pattern for controlling the plurality of programmable switches to progressively energize the plurality of resonant structures, and
    fabricating an integrated circuit chip comprising the clock grid;
    wherein the creating, the providing, and the determining are performed by a design module of a computing device.

2. The method of claim 1, wherein
    the plurality of switches include a number of increments that each provide energy to the respective one of the plurality of resonant structures; and
    the transition pattern includes a number of transitions corresponding to the number of increments.

3. The method of claim 2, wherein the determining the transition pattern comprises:
    determining a number of transitions available between the resonant mode and the non-resonant mode;
    determining a total time for transition between the resonant mode and the non-resonant mode; and
    determining a length for each of the transitions available between the resonant mode and the non-resonant mode.

4. The method of claim 2, further comprising minimizing the total time for transition.

5. The method of claim 1, wherein the creating the clock grid including the plurality of resonant structures comprises uniformly distributing in the clock grid a plurality of oscillator circuits including coupled inductors and capacitors.

6. The method of claim 1, wherein the design module is a synthesis/placement tool that is programmed to:
    read in parameters including: design definitions, physical area constraints, timing constraints, power constraints, design library information, synthesis rules, and operating conditions, and
    using the parameters, iteratively determine a layout for elements in an integrated circuit design.

7. An integrated circuit chip comprising a resonant clocking circuit fabricated using a system comprising:
    a computer device including a processor and a design tool that is structured and arranged to:
        model the resonant clocking circuit including a plurality of resonant structures having a respective plurality of switches that control the plurality of resonant structures to switch between a non-resonant mode and a resonant mode; and
        determine a transition pattern for activating the plurality of switches to progressively switch the plurality of resonant structures between the non-resonant mode and the resonant mode.

8. The integrated circuit chip comprising the resonant clocking circuit fabricated using the system of claim 7, wherein:
    each of the plurality of switches includes a number of increments that provide additional energy to respective one of the plurality of resonant structures; and
    the transition pattern includes a number of transitions corresponding to the number of increments.

9. The integrated circuit chip comprising the resonant clocking circuit fabricated using the system of claim 8, wherein the each of the increments corresponds to a field effect transistor (FET).

10. The integrated circuit chip comprising the resonant clocking circuit fabricated using the system of claim 7, wherein the computer device determines the transition pattern by:
    determining a number of transitions available between the resonant mode and the non-resonant mode;

determining a total time for transition between the resonant mode and the non-resonant mode; and determining a length for each of the transitions available between the resonant mode and the non-resonant mode.

11. The integrated circuit chip comprising the resonant clocking circuit fabricated using the system of claim 10, wherein the computer device further determines the transition pattern by minimizing the total time for transition.

12. The integrated circuit chip comprising the resonant clocking circuit fabricated using the system of claim 7, wherein:

the clocking circuit comprises a clock grid including the plurality of resonant structures;

the resonant structures are comprised of oscillator circuits including coupled inductors and capacitors; and the resonant structure are uniformly distributed in the clock grid.

\* \* \* \* \*